US006785891B1

(12) United States Patent
Allen et al.

(10) Patent No.: US 6,785,891 B1
(45) Date of Patent: Aug. 31, 2004

(54) DATA SHARING BETWEEN APPLICATION ENVIRONMENTS

(75) Inventors: Thomas Jay Allen, Rochester, MN (US); Christopher Mark Seyer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/416,341

(22) Filed: Oct. 12, 1999

(51) Int. Cl.[7] .............................................. G06F 9/54
(52) U.S. Cl. ..................... 719/313; 719/320; 709/201
(58) Field of Search ............................... 719/312, 313, 719/310, 317, 320; 709/201–203

(56) References Cited

U.S. PATENT DOCUMENTS

| | | | | |
|---|---|---|---|---|
| 5,922,044 A | * | 7/1999 | Banthia | 709/203 |
| 6,108,687 A | * | 8/2000 | Craig | 709/203 |
| 6,175,877 B1 | * | 1/2001 | Zerber | 709/310 |
| 6,233,609 B1 | * | 5/2001 | Mittal | 709/219 |
| 6,253,228 B1 | * | 6/2001 | Ferris et al. | 709/203 |
| 6,314,448 B1 | * | 11/2001 | Conner et al. | 709/202 |
| 6,324,685 B1 | * | 11/2001 | Balassanian | 717/118 |
| 6,430,568 B1 | * | 8/2002 | Hickey et al. | 707/103 Z |
| 2003/0140089 A1 | * | 7/2003 | Hines et al. | 709/202 |

OTHER PUBLICATIONS

Meckler, Andrew. "Java and Inter–Applet Communication". Dr. Dobbs Journal. Oct. 1997.*
Ciancarini, P. et al. "Coordinating distributed applets with Shade".*
Sun Microsystems. "Java Card 2.1 Runtime Environment (JCRE) Specification." Jun. 7, 1999.*
Montgomery, Michael et al. "Secure Object Sharing in Java Card". USENIX. 1999.*
Odaci, A. et al. "Java Concepts Validation Report". Version 2.1. Sep. 6, 1999.*
Baratloo, A. et al. "KnittingFactory: An Infrastructure for Distributed Web Aplications." Nov. 13, 1997.*
Fulton, Jennifer et al. "Netscape Navigator 6 in 1". Que Corporation. 1996.*

* cited by examiner

Primary Examiner—Lewis A. Bullock, Jr.
(74) Attorney, Agent, or Firm—Moser, Patterson & Sheridan, LLP (57) ABSTRACT

A method and program for dynamically sharing data between application environments such that the data persists beyond the termination of a data-providing application environment. In one embodiment of the invention, each of a plurality of HTML pages having respective applets are sequentially loaded within a visible frame store and retrieve data from an HTML page within a hidden frame. In this manner, the data produced by an applet persists beyond the termination of an HTML page providing the applet.

18 Claims, 4 Drawing Sheets

DATA SHARING BETWEEN APPLICATION ENVIRONMENTS

BACKGROUND OF THE INVENTION

1. Field of the Invention

The present invention relates to the information processing field. More particularly, the invention relates to a mechanism for sharing data between application environments.

2. Background of the Related Art

The Internet is a global set of interconnected computer networks communicating via a protocol known as the Transmission Control Protocol and Internet Protocol (TCP/IP). The World Wide Web (WWW) is a fully distributed system for sharing information that is based upon the Internet. Information shared via the WWW is typically in the form of HyperText Markup Language (HTML) pages. A display screen presented to a user via, e.g., a browser program, may comprise a singe HTML page or a plurality of HTML pages running within respective frames. An exemplary browser program comprises the Netscape® Navigator browser provided by Netscape Communications Corporation of Mountain View, Calif.

HTML pages are associated with particular WWW logical addresses and are communicated between WWW-compliant systems using the HyperText Transport Protocol (HTTP). In addition to standard text and graphics, HTML pages may include information structures known as "hypertext" or "hypertext links." Hypertext, within the context of the WWW, is typically a graphic or textual portion of a page which includes an address parameter contextually related to another HTML page. By accessing a hypertext link, a user of the WWW retrieves the HTML page associated with that hypertext link.

HTML pages may also include information structures known as "applets," which are small programs that are designed to run within another application, such as a browser. Within the browser context, an applet within an HTML page is typically executed upon the loading of the HTML page or upon the selection of an applet-representative object within the HTML page. An HTML page may include several-applets, such as an applet that executes upon opening the page and applets that execute upon the selection of respective applet-representative objects within the page.

It is often desirable to procure data from, e.g., a user interacting with an applet running within an HTML page and utilize the data at a future time. As such, it is also desirable to save the data such that the data is available at that future time. Interactive web pages typically store data in one of three ways; namely, within JavaScript variables, as "cookies," and by calling a CGI (Computer Gateway Interface) program.

JavaScript is a scripting language that is interpreted by a web page to provide applet-like functionality and store data. JavaScript is a trademark of Sun Microsystems, Inc. of Palo Alto, California. Unfortunately, JavaScript data is lost when the HTML page is changed, which tends to require that all information gathering functions and information processing functions be performed using a single, relatively large JavaScript segment. Unfortunately, an HTML page with such a large amount of JavaScript will load into a browser slowly. Moreover, JavaScript code may be examined even by a casual observer, thereby reducing security of the code.

Cookies are small pieces of information that are sent to a browser along with an accessed HTML page. When the cookie arrives, the browser generally saves this information to the user's hard disk drive such that the cookie "persists" or remains beyond the termination of the browser program. The cookie may be subsequently retrieved and/or modified by the cookie "owner" when the user again accesses the HTML page (or any page provided by the "owner" of the cookie). Cookies, while persistent on the client and thus not lost when the HTML page is changed, create various usability problems. Specifically, cookies are disfavored by a substantial number of users due to privacy and/or security concerns. These users do not allow the use of cookies on their systems and, therefore, the use of cookies to store or share data is impossible for these users.

A CGI program is a computer program that runs on a Web server. These programs use a specific API (application programming interface) called the Common Gateway Interface (CGI) to perform tasks such as accessing databases (e.g., to store data) and processing forms. CGI programs may be compiled programs or noncompiled programs (i.e., scripts). Unfortunately, CGI programs are relatively complex and, therefore, require substantial memory and other resources to implement. Such complexity and relatively high resource utilization is ill-suited to data storage within the context of a quick loading and executing applet interacting with a user via a browser application. Also, CGI scripts are unavailable if the HTML is separated from the server, such as when the HTML is stored on a compact disk.

SUMMARY OF THE INVENTION

The present invention generally provides a method and apparatus for dynamically sharing data between application environments such that the data persists beyond the termination of a data-providing application environment.

Specifically, a method according to the invention for sharing data between application environments, comprises the steps of: linking at least one data-representative object associated with a first application environment to a storage location associated with a second application environment, the storage location being modified in response to modifications made to the data-representative object associated with the first application environment.

In one embodiment of the invention, each of a plurality of HTML pages having respective applets are sequentially loaded within a visible frame in response to, e.g., user interaction. An HTML page within a hidden frame is used to provide storage for variables utilized by the various applets. That is, a "visible frame" applet stores and retrieves data from a "hidden frame" HTML page. The data may be processed by a hidden frame applet. In this manner, the data produced by a visible frame applet persists beyond the termination of the HTML page (or other application environment) supporting the applet.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The preferred embodiment of the present invention depicts a method and apparatus for sharing data between application environments. Illustratively, the application environments can be HTML pages providing user interactivity within, for example, the context of the AS/400 Information Center provided by IBM Corporation of Armonk, N.Y.

As will be described in detail below, aspects of the preferred embodiment pertain to specific method steps implementable on computer systems. In an alternative embodiment, the invention may be implemented as a computer program-product for use with a computer system. The programs defining the functions of the preferred embodiment can be delivered to a computer via a variety of signal-bearing media, which include, but are not limited to, (I) information permanently stored on nonwritable storage media (e.g., read-only memory devices within a computer such as CD-ROM disks readable by a CD-ROM drive); (ii) alterable information stored on writable storage media (e.g., floppy disks within diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent alternative embodiments of the present invention.

Figure 1:
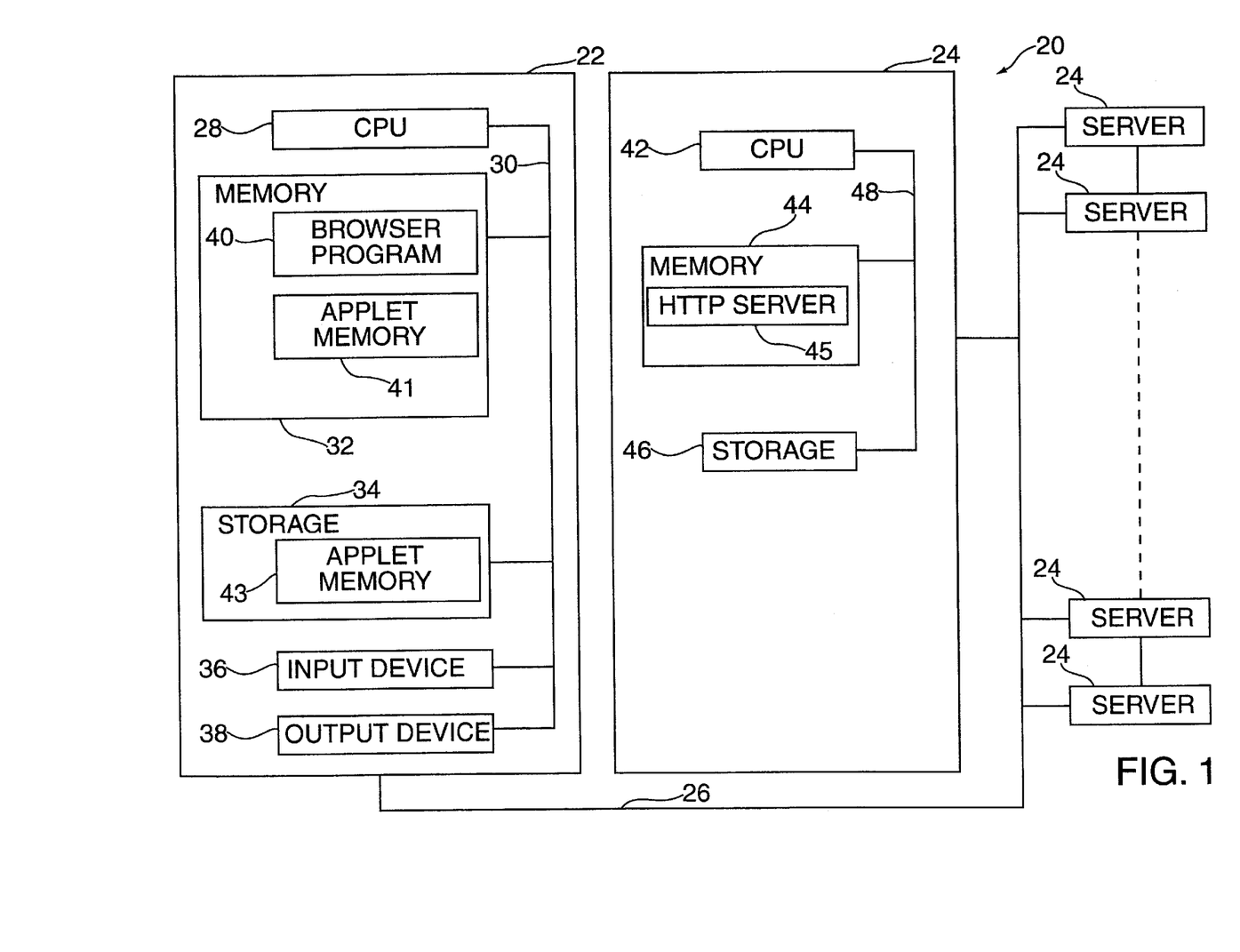
FIG. 1 depicts a data processing system in which the preferred embodiment of the invention may be implemented.

FIG. 1 depicts a data processing system 20 in which the preferred embodiment of the invention may be implemented. In general, the data processing system 20 includes a client computer 22 and at least one server computer 24 (five such servers 24 are shown). The client computer 22 and the server computer 24 may be components of the same computer system or may be separate components connected via a network 26, such as the Internet. The client computer 22 includes a Central Processing Unit (CPU) 28 connected via a bus 30 to memory 32, storage 34, input device 36 and output device 38. The input device 36 can be any device to give input to the client computer 22. For example, a keyboard, keypad, light pen, touch screen, button, mouse, track ball, or speech recognition unit could be used. The output device 38 is preferably any conventional display screen and, although shown separately from the input device 36, the output device 38 and input device 36 could be combined. For example, a display screen with an integrated touch screen, and a display with an integrated keyboard, or a speech recognition unit combined with a text speech converter could be used.

Memory 32 is preferably a random access memory sufficiently large to hold the necessary programming and data structures of the invention. While memory 32 is shown as a single entity, it should be understood that memory 32 may in fact comprise a plurality of modules, and that the memory 32 may exist at multiple levels, from high speed registers and caches to lower speed but larger DRAM chips. Memory 32 contains a browser program 40 that, when executed on the CPU 28, provides support for navigating between the various servers 24 and locating addresses at one or more of the servers 24. Memory 32 contains applet memory 41 that is used to provide temporary storage for applets executed within a respective application environment, such as HTML pages loaded into browser frames for presentation in a display window. The applet memory 41 may be a portion of the memory associated with a single HTML page. The applet memory 41 may be used to support a plurality of applets and/or HTML pages using appropriate memory management techniques. The contents of memory 32 can be loaded from and stored to the storage 34 as CPU 28 has a need for it.

Storage 34 is preferably a DASD (Direct Access Storage Device), although it could be other storage such as floppy disc drives or optical storage. Although storage 34 is shown as a single unit, it could be any combination of fixed and/or removable storage devices, such as fixed disc drivers, floppy disc drives, tape drives, removable memory cards, or optical storage. Memory 32 and storage 34 could be part of one virtual address space spanning multiple primary and secondary storage devices. Storage 34 contains non-volatile applet memory 43 that is used to provide storage for applets executed within, for example, HTML pages loaded into browser frames. The applet memory 43 may be used to support a plurality of applets using appropriate memory management techniques. The invention may be practiced using either one (or both) of the applet memory 41 and the non-volatile applet memory 43. For example, each of a sequence of HTML pages stored in storage 34 may be selectively loaded into a portion of memory 41 associated with an application environment. Modifications to variables within the loaded HTML page may result in corresponding modification(s) to linked variables resident in another portion of memory 43 or in a portion of storage 34. This operation of the invention will be discussed in more detail below with respect to FIGS. 2–4.

Each server computer 24 generally comprises a CPU 42, memory 44, and storage 46 coupled to one another by a bus 48. The memory 44 is random access memory sufficiently large to hold the necessary programming and data structures that are located on the server computer 24 according to a network information address, e.g., a URL. As shown, the memory 44 includes an http server process 45 adapted to service requests from the client computer 22 regarding HTML documents. The programming and data structures may be accessed and executed by the CPU 42 as needed. The storage 46 is provided for long-term storage of implementation code and data needed during operation.

FIG. 1 is merely one hardware configuration for data processing system 20. A preferred embodiment of the present invention can apply to any comparable hardware configuration, regardless of whether the computer system is a complicated, multi-user computing apparatus, a single-user workstation, or a network appliance that does not have non-volatile storage of its own.

Figure 2:
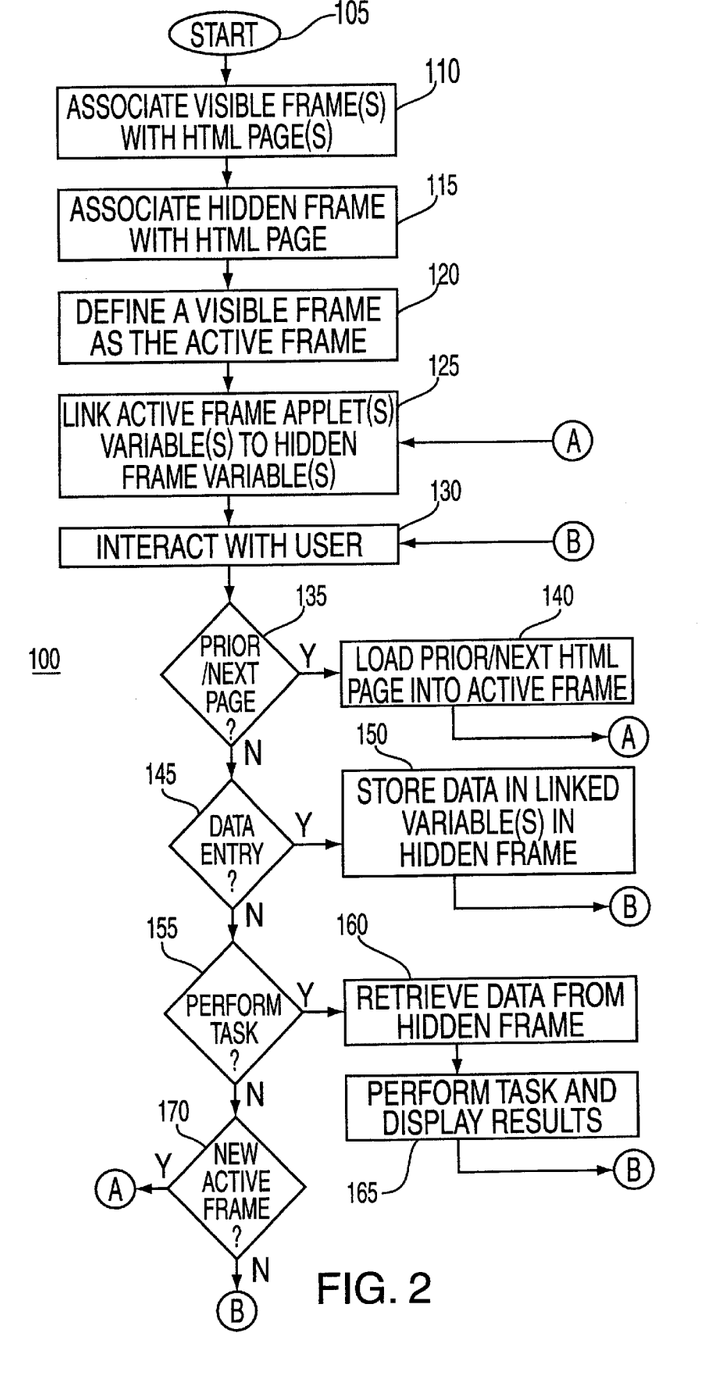
FIG. 2 depicts a flow diagram of a method for sharing data between application environments.

FIG. 2 depicts a flow diagram of a method for sharing data between application environments. Specifically, FIG. 2 depicts a method 100 utilizing an HTML page, such as an HTML page within a hidden frame, to store variables utilized by applets running in other HTML pages within respective frames, i.e. visible frames. A "hidden" HTML page comprises an HTML page that is loaded into a hidden frame, while a "visible" HTML page comprises an HTML page loaded into a visible frame. A frame may by hidden when a size parameter associated with the frame is set to zero. A single HTML page may be loaded into a frame. Multiple applets may be included within a single HTML page. It should be noted that while the invention will be primarily described as utilizing hidden HTML pages to store variables, non-hidden or visible HTML pages may also be utilized to store such variables. Moreover, other application environments supporting the execution of applets and the storage of applet-associated information may be utilized to practice the invention.

The method 100 of FIG. 2 is entered at step 105 when, for example, an HTML page is accessed by a user and loaded into a viewable window via a browser program. At step 110 one or more visible frames are generated, with each visible frame being associated with a respective HTML page. That is, an HTML page is loaded into each visible frame. The resulting display of one or more visible HTML pages within respective visible frames provides, for example, a graphical user interface enabling a user to interact with a remote information provider such as a website, or with a local information source such as a Help or Information Center stored on, for example, a CD-ROM. A viewable browser window including one hidden frame and a plurality of visible frames will be described in more detail below with respect to FIG. 4.

At step 115 a hidden frame is generated and associated with a respective HTML page. That is, an HTML page running an applet is loaded into the hidden frame. The hidden frame HTML page includes a plurality of memory locations intended to be used for variable storage for applets running in the HTML pages of the visible frames. The applet running in the HTML page of the hidden frame is responsive to data write (store in memory) and data read (retrieve from memory) commands from visible frame applets to, respectively, store data in hidden frame variable locations or retrieve data from hidden frame variable locations.

In one embodiment of the invention, the applet running within the HTML page loaded into the hidden frame cannot be terminated by user interaction other than termination of the browser application itself, or termination of all the frames within the browser viewing window.

At step 120 one of the visible frames is defined as an "active" frame. That is, in the case of a graphical user interface having a plurality of visible frames, one of the visible frames is designated as an active frame by default selection or user interaction. The active frame is that frame which provides a response, if any, to a user interaction. For example, if the active frame includes an HTML page having an applet that is being executed, a user interaction will be with that applet. Thus, user interaction with the display screen will result only in a user interaction with the applet running on the HTML page within the active frame. Typically, a user may select a different frame as the active frame by selecting that frame using an input device such as a mouse.

At step 125 any variables utilized by the applet(s) running within the HTML page of the defined active frame are linked to corresponding variables within the hidden frame. The variable may comprise any type of variable (e.g., character string, numeric, pointer and the like) suitable for use in storing information utilized by the applet (e.g., user data entry, intermediate data processing results and the like). For example, in the case of an HTML page within the active frame comprising an applet utilizing three variables, those three variables are linked to three corresponding variables within the HTML page of the hidden frame. Thus, user interaction with the applet running within the visible frame resulting in the modification of data stored within any of the three variables will cause a modification of the three corresponding variables within the hidden frame.

In the case of the user interaction causing a new HTML page to be loaded into the frame (thereby terminating the old HTML page applet), the variable data stored within the hidden frame HTML page by the old HTML page applet will survive. That is, user interaction causing the termination of a visible frame applet (by terminating the visible frame HTML page or the visible frame itself) will not result in a loss of the data stored in the variables by the old HTML page applet.

In one embodiment of the invention, the old HTML applet initializes the variable data stored within the hidden frame HTML page in response to user selection of a hypertext link that will load a new HTML page. In this embodiment, the selected hypertext link comprises an object including a variable initialization routine followed by a standard hypertext load function call.

The linking of variables between the various applets in the various visible frames may be performed in a number of ways. The active frame variables may be mirrored by the hidden frame HTML page (i.e., stored in both the hidden frame HTML page and the visible frame HTML page) or provided entirely by the hidden frame HTML page (i.e., indirect memory storage of variables solely within the hidden frame HTML page utilizing pointers or similar data structures). Moreover, the hidden frame variables may be pre-assigned to a visible frame applet or assigned in response to a memory allocation request made by the visible frame applet. The memory allocation request may occur upon the initial loading of the HTML page including the applet, upon the selection of the visible frame including the applets as an active frame or at some other time (e.g., a user indicates that a large amount of data is to be provided and the applet responsively requests an allocation of memory to accommodate the data).

In one embodiment of the invention, each variable utilized by an applet running within an HTML page in a visible frame comprises a pointer to a particular variable within the HTML page of the hidden frame. The pointer is provided to the visible frame HTML page by an applet running in the hidden frame HTML page. The hidden frame applet provides the pointer in response to a request from the visible frame applet to provide a memory location or, more specifically, to provide a pointer to a memory location. The memory location may have a specific data type (e.g., character string, numeric, defined data structure and the like).

At step 130, the method 100 interacts with the user. That is, at step 130 user interaction with the presently active frame or, more specifically, user interaction with an applet running within the HTML page of the presently active visible frame occurs. The user interaction may comprise the selection of an object (e.g., a radio button, a pull-down menu and the like) within a dialog box or other data structure, the entry of text into a field supporting such entry (with or without a confirmation via selection of an "enter" button), or other such user interaction commonly known to those skilled in the art.

At step 135 a query is made as to whether the user interaction of step 130 comprises the selection of one of a prior or next HTML page to be loaded into the presently active frame. That is, a query is made as to whether the user interacting with the applet has indicated via, for example, selection of a "prior" or "next" button indicative of a desire to close the currently loaded HTML page within the active frame and/or open a prior HTML page or a next HTML page, respectively. If the query at step 135 is answered affirmatively, then the method proceeds to step 140. If the query at step 135 is answered negatively, then the method 100 proceeds to step 145.

At step 140, the prior or next HTML page is loaded into the active frame. That is, the next HTML page or prior HTML page (with respect to the presently loaded HTML page) is loaded into the active frame in place of the present HTML page. The method 100 then proceeds to step 125, where the variables of the applet running in the newly loaded next or prior HTML page are linked to storage locations within the hidden frame HTML page.

At step 145, a query is made as to whether a data entry user interaction has occurred. That is, a query is made as to whether the user has provided or modified data such that a modification to the appropriate (i.e., corresponding) variable within the hidden frame should be made. If the query at step 145 is answered affirmatively, then the method 100 proceeds to step 150. If the query at step 145 is answered negatively then the method 100 proceeds to step 155.

At step 150 the added or modified data is stored in the appropriate linked variable(s) within the HTML page of the hidden frame. In one embodiment of the invention, this data storage occurs when the visible frame HTML page applet calls a "StoreValue" function that operates to transfer data (using direct or indirect addressing) to the hidden frame HTML page. The hidden frame HTML page applet, in response to the StoreValue function call, stores the data passed from the visible frame HTML page applet in a memory space allocated for such storage within the HTML page. The method 100 then proceeds to step 130.

At step 155, a query is made as to whether a particular task is to be performed. Such a task may include, e.g., a summation of a previously entered group of numeric data elements, the sorting of a list, the processing, in fact, of any available information to achieve a desired result. If the query at step 155 is answered affirmatively, then the method 100 proceeds to step 160. If the query at step 155 is answered negatively, then the method 100 proceeds to step 170.

At step 160, the data necessary to perform the task indicated at step 155 is retrieved from the appropriate variables within the hidden frame. That is, if a task requires the processing of data stored within each of a plurality of variables within the HTML page of the hidden frame, the data stored in these variables is retrieved from the hidden frame HTML page. In one embodiment of the invention, this data retrieval occurs when the visible frame HTML page applet calls a "RetrieveValue" function that operates to transfer data (using direct or indirect addressing) from the hidden frame HTML page. The hidden frame HTML page applet, in response to the RetrieveValue function call, retrieves the indicated data from the appropriate memory space and passes the retrieved data to the visible frame applet for further processing.

At step 165, the task is performed and the results, if any, are displayed, stored in the hidden frame HTML page or otherwise utilized. Step 165 can be illustrated in the context of a simple commercial transaction. Assume that a user interface is provided a plurality of temporally successive HTML pages within a visible frame, where each of the HTML pages includes a respective applet that interacts with a user to responsively store user-supplied data in an HTML page within a hidden frame. The user-supplied data comprises, e.g., quantity and identification of items to be purchased, purchase price of identified items, user name, shipping address, credit card number and the like. If the task to be performed is the generation of an invoice detailing the transaction, the user-supplied data stored by each visible frame HTML page applet in the hidden frame HTML page is retrieved and then processed to generate the invoice. The processing is performed by an applet running within the last HTML page running within the visible frame (i.e., the "checkout" page). The method 100 then proceeds to step 130.

At step 170 a query is made as to whether a new visible frame has become the active frame. For example, the user may have selected a different visible frame via a pointing device. As such, any applet running in an HTML page within the newly selected active page may require memory storage within the HTML page of the hidden frame. Prior to such memory storage being realized, it is necessary to link the variables to be stored with appropriate memory space within the hidden frame HTML page (this is accomplished at step 125).

If the query at step 170 is answered affirmatively, then the method 100 proceeds to step 125. If the query at step 170 is answered negatively, then the method 100 proceeds to step 130.

The above-described method advantageously provides for the dynamic sharing of data between application environments, such as HTML pages, such that the data persists beyond the termination of a data-providing application environment or a frame including the application environment. That is, data provided to the hidden frame HTML page (or other application environment) by an HTML page (or other application environment) that has been closed is still available to other HTML pages (or other application environments). Upon re-opening the data-providing HTML page, the data from the hidden frame HTML page may be used to repopulate local variables or restore objects to a pre-closure state. Additionally, data provided to the hidden frame HTML page by a first HTML page may be accessed by a second HTML page and modified as necessary to achieve a data processing function.

Figure 3:
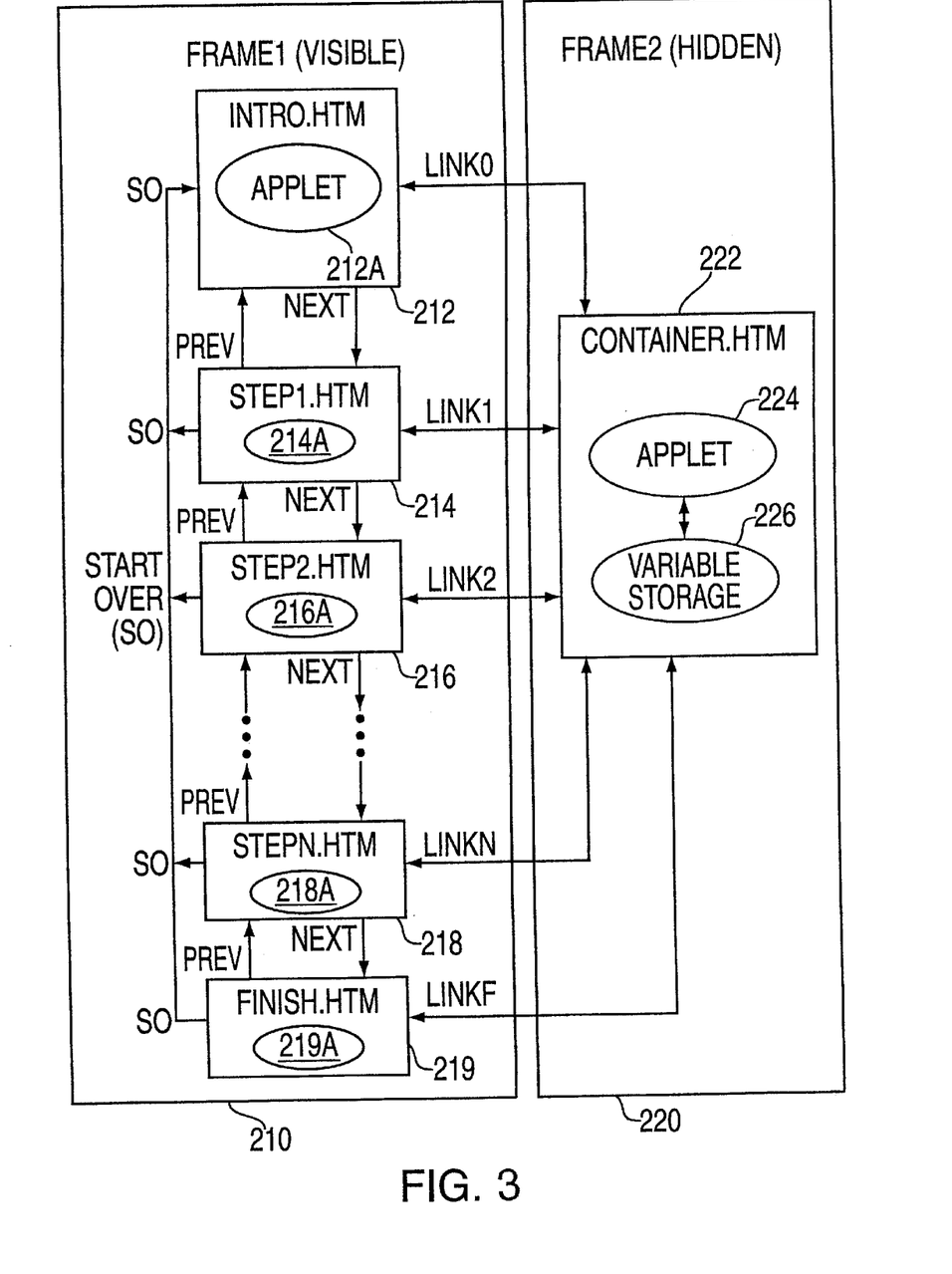
FIG. 3 depicts a high level block diagram graphically representing interactions between a sequence of HTML pages of a visible frame and an applet running in a hidden frame.

FIG. 3 depicts a high level block diagram graphically representing interactions between a sequence of application environments, such as a sequence of HTML pages of a visible frame and an applet running in a hidden frame. Specifically, FIG. 3 comprises a graphical representation of the contents of a first frame 210 and a second frame 220.

The second frame 220 comprises a hidden frame that is used in the manner described above with respect to FIG. 2. The hidden frame is depicted as including an applet 224 and a memory space 226 (denoted as variable storage). Upon generation of the second frame 220 (step 115 of the method of FIG. 2) an HTML page 222 (denoted as CONTAINER.HTM) is loaded into the hidden frame and the applet 224 is run. The applet 224 of the hidden page 220 is run when the hidden page 220 is loaded. The applet is responsive to StoreValue and RetrieveValue function calls provided by the applets 212A–219A running within the HTML pages 212–219 of the visible frame 210.

The first frame 210 comprises a visible frame such that a user may interact with objects within the frame to achieve a particular data entry or other purpose. The first frame 210 is depicted as including a plurality of HTML pages 212 through 219. Each of the HTML pages is depicted as including a respective applet 212A through 219A. Variables used by the applets 212A through 219A of the visible frame HTML pages 212–219 are linked to the variable storage 226 memory space within the hidden frame HTML page 222 via respective link paths LINK0-LINKF (step 125 of the method of FIG. 2). The link paths LINK0-LINKF depicted in FIG. 3 are graphical representations of the flow of data between the visible page applet(s) and the hidden page applet(s).

Only one of the visible frame HTML pages will be loaded at any given time. Specifically, upon generation of the first frame 210 (step 110 of the method of FIG. 2), a first HTML page 212 (denoted as INTRO.HTM) is loaded into the visible frame and the applet 212A is run. The first HTML page 212 may include, for example, an applet providing introductory imagery for a particular application. A user may interact (step 130 of the method of FIG. 2) to retrieve or provide data to the applet 212A (step 150 of the method of FIG. 2) and cause various tasks to be performed (steps 160–165 of the method of FIG. 2).

In response to a "next page" command from the user, the first HTML page 212 will be closed and a second HTML page 214 (denoted as STEP 1.HTM) will be loaded into the visible frame (step 140 of the method of FIG. 2). While the second HTML page 214 is loaded and the second applet 214A is running, a "next page" command from the user will result in the second HTML page 214 being closed and a third HTML page 216 (denoted as STEP 2.HTM) will be loaded into the visible frame. Similarly, a "prior page" or "go back" command from the user will result in the second HTML page 214 being closed and the first HTML page 212 being reloaded.

The process of sequentially opening next and prior HTML pages within the visible frame in response to user commands provides a means of user navigation between all the visible frame HTML pages 212–219. It should be noted that the HTML pages depicted in the first frame 210 of FIG. 3 are denoted as, respectively, INTRO.HTM, STEP1.HTM, STEP2.HTM and so on up to STEPN.HTM and, finally, FINISH.HTM. Thus, there is no limit to the number of pages that may be used to provide navigation functionality within the context of the invention.

Additional navigation flexibility between pages can be facilitated by various commands. For example, a "start over" command causes the currently loaded page to close (except the first HTML page 212) and the first HTML page 212 to load into the visible frame. Optionally, the "start over" command resets (i.e., clears) the values stored in the hidden frame (or non-hidden frame) applet variables. In one embodiment of the invention, a new HTML page is loaded into the visible frame each time a value is selected. In this manner, a history of user selections may be provided. Additionally, "forward" and "back" browser commands allow a user to navigate between HTML pages that have previously been loaded into the currently active frame.

The HTML pages loaded into the visible frame are not necessarily associated with each other as a linear sequence of pages. That is, it is not necessary for each HTML page to be associated with a predetermined "next" or "previous" HTML page within a sequence of HTML pages. Rather, the HTML pages may be dynamically linked based upon user input, context or other factors. That is, the next HTML page to be loaded into the visible frame may comprise one HTML page within a set of HTML pages, wherein the HTML page actually loaded is determined in response to user input or other criteria.

In another embodiment of the invention, a "main" HTML page (or other application environment) may include single-level or multiple-level HTML "sub-pages" (or other application environments). The main HTML page is loaded in response to a user returning from an associated HTML sub-page. Accordingly, a series of sub-pages, accessed from the main HTML page, may be loaded and interacted with by the user. Once each of the appropriate sub-pages has been accessed, the data stored to the hidden frame HTML page can be used to perform a task (step 165).

The above-described invention finds great utility within the context of "advisor" applications. An advisor is a program that typically interacts with a user to achieve some program objective. An advisor is a program that comprises software routines that interact with the user via a graphical user interface (GUI) to ask a series of questions and retrieve a corresponding series of answers from the user regarding a particular function to be performed.

Wizards are programs similar to advisors except that wizards typically have full access to the operating system of the user's computer and, therefore, answers to questions posed by a wizard may be stored oil a hard drive or other storage medium within a user's computer. An advisor is not granted access to the computing resources due to various security considerations. Since advisors provide a security overlay typically not found in wizards, advisors tend to be used in client/server relationships where a client is interacting with a server via, for example, the Internet to retrieve information or perform some other function.

Figure 4:
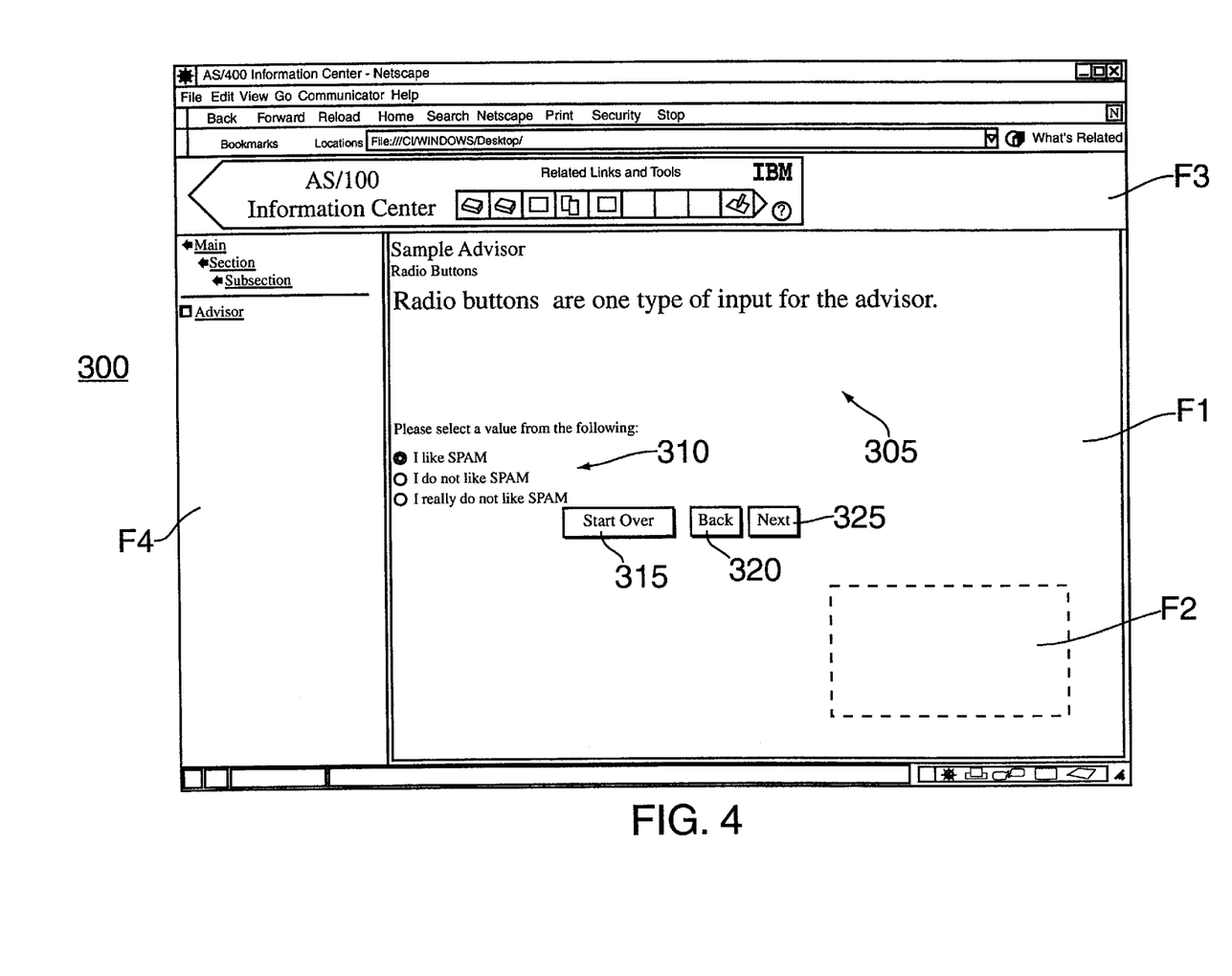
FIG. 4 depicts a display screen of an advisor application utilizing the present invention.

FIG. 4 depicts a display screen 300 of an advisor application utilizing the present invention. The exemplary advisor application comprises an "Information Center" application for users of the IBM AS/400 computer system. This advisor application is implemented as a series of related HTML pages running respective applets that allow a user to interact such that information is provided to (or retrieved from) a database comprising help information and other information. As previously discussed, non-hidden or visible HTML pages may also be utilized to store such variables.

Specifically, FIG. 4 depicts a browser window comprising a first frame F1, a second frame F2, a third frame F3 and a fourth frame F4. The first F1, third F3 and fourth F4 frames are visible, while the second frame F2 is hidden. It should be noted that while the second frame F2 is depicted by dashed lines defining an area within the first frame F1, the second frame F2 has a size parameter of zero such that the frame is not visible. As such, the dimensions of the dashed lines are merely indicative of the second frame being present in the drawing and not visible.

A third frame F3 comprises a graphical imagery for defining the context within which a user is interacting with the system. In the application of FIG. 4, the third frame F3 defines the context as the AS/400 Information Center. It should be noted that active objects within the third frame F3 (and any other visible frame) may be provided such that selection of an active object results in a new HTML page or frame associated with that object being loaded. The fourth frame F4 is used within the information center context as a location indicator for locating the user within a "tree" of possible locations or functions.

The first frame F1 includes a text portion 305, a plurality of radio buttons 310, a "start over" button 315, a "back" button 320 and a "next" button 325. The frame F1 is used for providing a primary graphical user interface via applets running within HTML pages loaded into the first frame F1.

A user manipulates the data objects within HTML page(s) loaded into the first frame F1 in the manner previously described with respect to FIG. 2 and FIG. 3. Manipulation of these data objects (e.g., radio buttons 310, "start over" button 315, "back" button 320 and "next" button 325) is processed by the applet running within the HTML page. If the processing of the data results in modifications to variables, then the data is provided to the applet running within the HTML page of the hidden frame F2. In this manner, the advisor provides information to the user in response to user requests without providing access to the underlying computing resources.

Although various embodiments which incorporate the teachings of the present invention have been shown and described in detail herein, those skilled in the art can readily devise many other varied embodiments that still incorporate these teachings. For example, while the invention has been primarily described within the context of sharing data between HTML data structures, it will be appreciated by those skilled in the art that the invention has broad applicability to the sharing of data between non-HTML data structures and between a combination of HTML and non-HTML data structures. For example, the invention may be implemented using dynamic HTML (DHTML), extended markup language (XML) or the handheld device markup language (HDML). Other "mark-up" languages or application environments supporting applets may benefit from the invention. Additionally, it should be noted that the invention does not require Internet related protocols, such as HTTP, to be practiced. In summary, other present, evolving and/or future environments and protocols may be advantageously employed to practice the invention.

While the foregoing is directed to the preferred embodiment of the present invention, other and further embodiments of the invention may be devised without departing from the basic scope thereof, and the scope thereof is determined by the claims that follow.

What is claimed is:

1. A method for sharing data between environments in a browser application, comprising:

linking, by cooperation of a first applet and a second applet, at least one data-representative object associated with a first page to a storage location associated with a second page, the storage location being modified in response to modifications made to the data-representative object, wherein the first applet is executing within the first page and the second applet is executing within the second page and wherein the first page is loaded into a visible frame of the browser application and wherein the second page is loaded into a hidden frame of the browser application;

navigating away from the first page to another page in the visible frame;

navigating back to the first page in the visible frame; and passing, from the second applet to the first applet, data from the storage location corresponding to the modifications made to the data-representative object.

2. The method of claim 1, wherein the second page comprises one of an HTML page, a DHTML page, an XML page and an HDML page.

3. The method of claim 1, wherein the step of linking comprises the step of assigning a pointer to the data-representative object; the pointer defining the storage location and a data type.

4. The method of claim 1, wherein the first applet modifies the data-representative object in response to a user input.

5. The method of claim 4, wherein the first applet communicates the modifications made to the data-representative object via a first function call.

6. The method of claim 4, wherein the second applet modifies the storage location in response to the first function call, and for retrieves the contents of the storage location in response to a second function call.

7. A signal-bearing medium containing a program for storing data, wherein the program, when read and executed by a computer, comprises the steps of:

linking, by cooperation of a first applet and a second applet, at least one data-representative object associated with a first page to a storage location associated with a second page, the storage location being modified in response to modifications made to the data-representative object, wherein the first applet is executing within the first page and the second applet is executing within the second page and wherein the first page is loaded into a visible frame of the browser application and wherein the second page is loaded into a hidden frame of the browser application;

navigating away from the first page to another page in the visible frame;

navigating back to the first page in the visible frame; and passing, from the second applet to the first applet, data from the storage location corresponding to the modifications made to the data-representative object.

8. The program of claim 7, wherein the second page comprises one of an HTML page, a DHTML page, an XML page and an HDML page.

9. The program of claim 7, wherein the step of linking comprises the step of assigning a pointer to the data-representative object, the pointer defining the storage location and a data type.

10. The program of claim 7, wherein the first page comprises an HTML page within a visible frame in a display window, and the second page comprises a hidden frame within the display window.

11. The advisor application of claim 7, wherein the first and second pages comprise at least one of an HTML page, a DHTML page, an XML page and an HDML page.

12. The program of claim 7, wherein the first applet modifies the data-representative object in response to a user input.

13. The program of claim 12, wherein the first applet communicates the modifications made to the data-representative object via a first function call.

14. The program of claim 12, wherein the second applet modifies the storage location in response to the first function call, and for retrieves the contents of the storage location in response to a second function call.

15. A browser application, comprising:

a visible frame, comprising a plurality of pages that are backwards and forwards navigable with respect to one another, wherein each of the plurality of pages has an applet for receiving data; and a hidden frame, including a page having an applet and a memory space; wherein the applets of the plurality of pages are adapted to provide received data to the applet of the page of the hidden frame, and wherein the applet of the page of the hidden frame is adapted to store the received data in the memory space and to pass data, previously received from a given applet of a given page, back to the given applet when a user navigates back to the given page.

16. The browser application of claim 15, wherein the pages of visible and hidden frames comprise at least one of an HTML page, a DHTML page, an XML page and an HDML page.

17. A method for sharing data between web pages displayed by a browser application, comprising the steps of:

generating a hidden frame of the browser application;

loading a web page into the hidden frame;

running a hidden applet within the web page;

generating a visible frame of the browser application;

successively loading web pages into the visible frame;

running a separate applet within each successively loaded web page, wherein each separate applet receives data from a user;

receiving user-input data for a given one of the separate applets associated with a given one of the successively loaded web pages;

passing the user-input data to the hidden applet;

navigating to a next successive web page of the successively loaded web pages;

navigating backwards to the give one of the successively loaded web pages; and passing the user-input data from the hidden applet to the given one of the separate applets.

18. The method of claim 17, further comprising:

passing data between the hidden applet and the separate applets; and storing, by the hidden applet, data received from the separate applets.

\* \* \* \* \*